United States Patent
Lin et al.

(10) Patent No.: US 7,082,429 B2
(45) Date of Patent: Jul. 25, 2006

(54) METHOD FOR WEB CONTENT FILTERING

(75) Inventors: Po-Ching Lin, Hsinchu (TW); Ying-Dar Lin, Hsinchu (TW); Ming-Dao Liu, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 9 days.

(21) Appl. No.: 10/731,472

(22) Filed: Dec. 10, 2003

(65) Prior Publication Data
US 2005/0131868 A1 Jun. 16, 2005

(51) Int. Cl.
G06F 17/30 (2006.01)
(52) U.S. Cl. .............................. 707/5; 707/6
(58) Field of Classification Search ................ 707/3, 707/4, 5, 6, 100, 104.1
See application file for complete search history.

(56) References Cited

U.S. PATENT DOCUMENTS

| | | | | |
|---|---|---|---|---|
| 5,987,606 | A | 11/1999 | Cirasole et al. | 713/200 |
| 6,321,267 | B1 | 11/2001 | Donaldson | 709/229 |
| 6,389,472 | B1 | 5/2002 | Hughes et al. | 709/229 |
| 6,542,888 | B1 | 4/2003 | Marques | 707/5 |
| 6,651,057 | B1 * | 11/2003 | Jin et al. | 707/5 |
| 6,687,696 | B1 * | 2/2004 | Hofmann et al. | 707/6 |
| 2003/0088562 | A1 * | 5/2003 | Dillon et al. | 707/5 |
| 2003/0208485 | A1 * | 11/2003 | Castellanos | 707/5 |

OTHER PUBLICATIONS

K. Nigam, et al.; "Text Classification From Labeled and Unlabeled Documents Using EM"; *Machine Learning, Kluwer Academic Press*; 1999; pp. 1-34.

R. Ghani et al.; "Hypertext Categorization Using Hyperlink Patterns And Meta Data"; *The Eighteeth International Conference On Machine Learning )ICML '01)*; 2001; pp. 178-185.

Ming-Dao Liu, Ying-Dar Lin; "Early Blocking And Bypassing For Accelerating Web Content Filtering"; *Department of Computer and Information Science, National Chiao-Tung University*; pp. 1-25.

* cited by examiner

Primary Examiner—Sam Rimell
(74) Attorney, Agent, or Firm—Troxell Law Office, PLLC

(57) ABSTRACT

The present invention provides a method of web content filtering, which can be applied to gateway devices at client ends. When an access request for a web page from a browser is sent, by analyzing the web page content returned from the web site, we can decide whether the page is allowed or not, by early blocking and early bypassing algorithms. It allows making the decision as early as we have enough confidence that the web content should belong to some forbidden category or a normal one. Therefore, the web content determination speed can be improved and users' waiting time can be reduced. Moreover, by the present method, the network gateway devices will be allowed to analyze more web content.

6 Claims, 6 Drawing Sheets

METHOD FOR WEB CONTENT FILTERING

FIELD OF THE INVENTION

The present invention is a method of web content filtering, and more particularly is related to a method of web content filtering for network security management.

BACKGROUND OF THE INVENTION

Massive volume of various kinds of digital content on web pages is widely accessible on the Internet nowadays. Therefore, software or hardware for web content filtering has been developed in the market recently. For one thing, minors could be automatically prohibited from accessing pornographic or violent content on web pages through the Internet. For another, a company may control their employees not to engage in matters through the Internet other than work. In order to meet such demands, some hardware devices, such as NetPure 5000 from Allot, are developed. In both Taiwan and the United States, this kind of products becomes indispensable now.

Under current techniques, there are several ways to determine whether the accessed web pages contain content supposed to be forbidden:

1. Build a database of Universal Resource Indicators (URIs) of predetermined forbidden web pages to match the URI of the current web page request against the database. If matched, forbid access to the web pages. Most of current products use this method to filter web content. However, in this method, an enormous database needs to be maintained. It is often undesirable.
2. Use keyword or key-phrase matching to check whether certain keywords as the selected features exist within the content of the web page. However, there is a high possibility to mis-filtering. For example, many web pages discussing gender will be filtered out when "sex" is used as a keyword. The filtering quality is disappointing.
3. Use self-learning methods on certain sample web pages and then classify the web pages automatically. Although decision precision in this manner is better, it requires fully scanning the whole content on the web page during the classification process, making the efficiency worse.

SUMMARY OF THE INVENTION

The main objective of the present invention is to solve or avoid the problems mentioned above. The present invention provides a method for web content filtering, which has self-learning ability, high decision precision and high filtering efficiency.

To achieve the above objective, the method for web content filtering of the present invention considers: 1. under the condition of not losing precision, to early determine to block web pages; 2. under the condition of not losing precision, to early determine to bypass web pages, 3. to apply the traditional text classification method to web content filtering. That the transmission efficiency of the present invention can be 4 times improved is expected. Moreover, web content filtering implementation on gateway system at client's ends becomes possible.

BRIEF DESCRIPTION OF THE DRAWINGS

The present invention will be better understood from the following detailed description of preferred embodiments of the invention, taken in conjunction with the accompanying drawings, in which.

DETAIL DESCRIPTION OF THE INVENTION

The following descriptions of the preferred embodiments are provided to understand the features and the technical information of the present invention.

Figure 1:
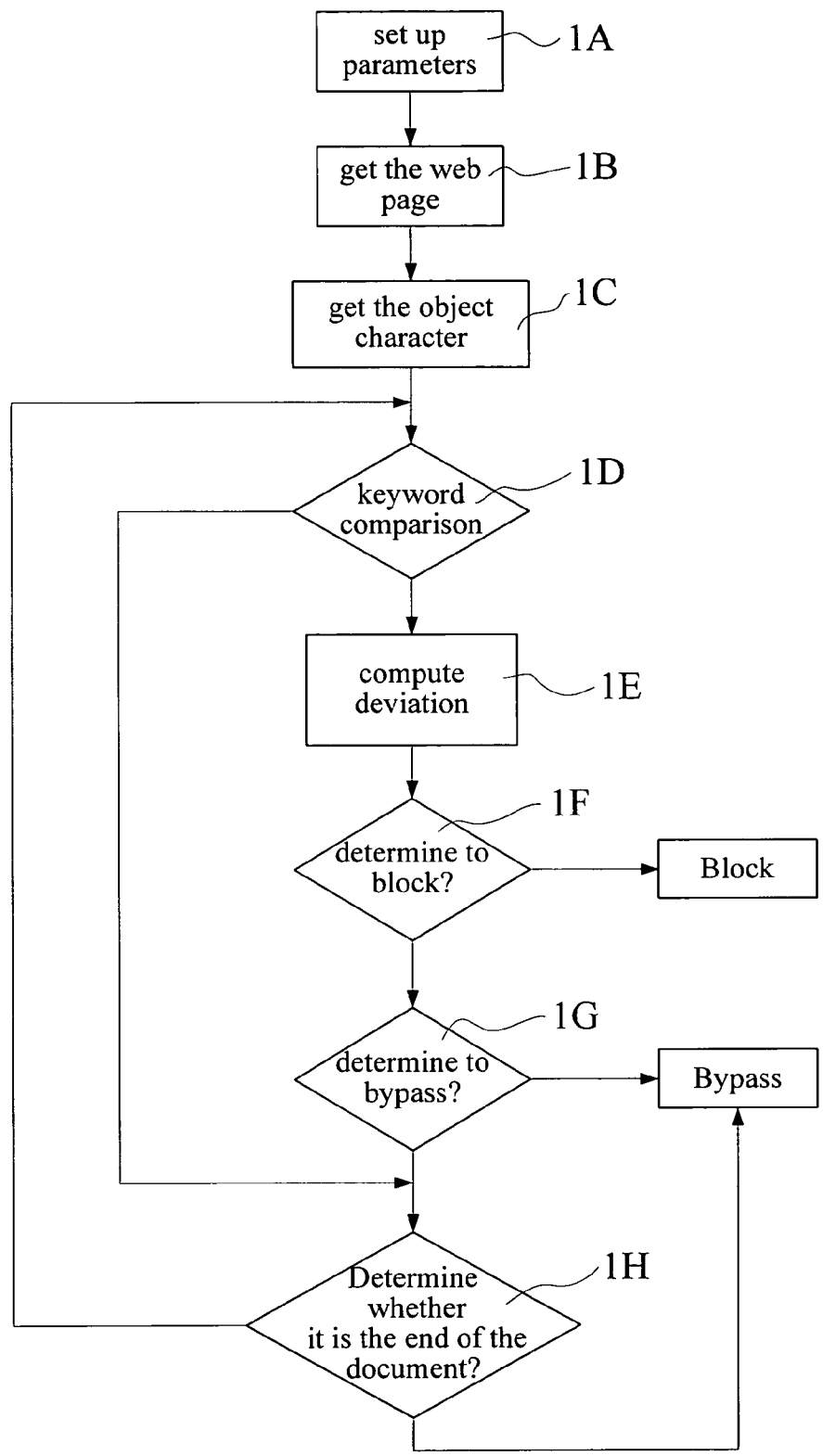
FIG. 1 shows a flow chart of a method for web content filtering of the present invention.

FIG. 1 shows a flow chart of the present invention for web content filtering executed by computers to determine to bypass or block web pages. Generally, it can be applied to gateway devices. When a web page access request is sent out from a web browser, by analyzing web pages responded from web sites, the device can determine whether the web pages are allowed to pass through the gateway. The procedure is listed below.

(1A) build web page filtering decision criteria, at least including keyword set, a relevance probability chart for every keyword, a blocking threshold, and a bypassing threshold, and a score deviation (SD);

(1B) analyze the web page from the web server;

(1C) look for the next keyword;

(1D) determine whether the current word is a keyword, if yes, further proceed to the next step; if not, go to step (1H) and continue to analyze the web page;

(1E) re-compute the score deviation between the highest score and the second higher score from each category based on the relevance probability chart;

(1F) determine whether the score deviation exceeds the blocking threshold, if yes, label the web page as a forbidden one; if not, proceed to the next step;

(1G) determine whether the score deviation is lower than the bypassing threshold. if yes, label the web page as a bypassing one; if not, proceed to the next step;

(1H) read the next word from the web page and determine whether the end has been reached, if yes, label the web page as a bypassing one; if not, return to step (1D);

Therefore, by checking whether the score deviation exceeds the blocking or bypassing threshold, instead of scanning whole document, web pages with higher relevance to a forbidden category or to normal categories can be early blocked or bypassed without influencing the filtering accuracy. Accordingly, the web content filtering efficiency is substantially increased.

Suppose web pages belong to categories $C=\{c_1, c_2, \ldots, c_{|C|}\}$. In our example, it includes games, pornography, online shopping, financial investment, etc. The relevance probability and the score deviation are computed by the following steps:

(2A) initialize score category S corresponding to every category;

(2B) compute the scores in each category based on the relevance probability chart:

$$\mathrm{Score}(c_j \mid d_i) = \frac{P(c_j)\log\left(\prod_{k=1}^{di} P(w_{di,k} \mid c_j)\right)}{P(d_i)}$$

(2C) choose the two most significant scores;

(2D) set the difference of them as the score deviation SD.

Figure 2:
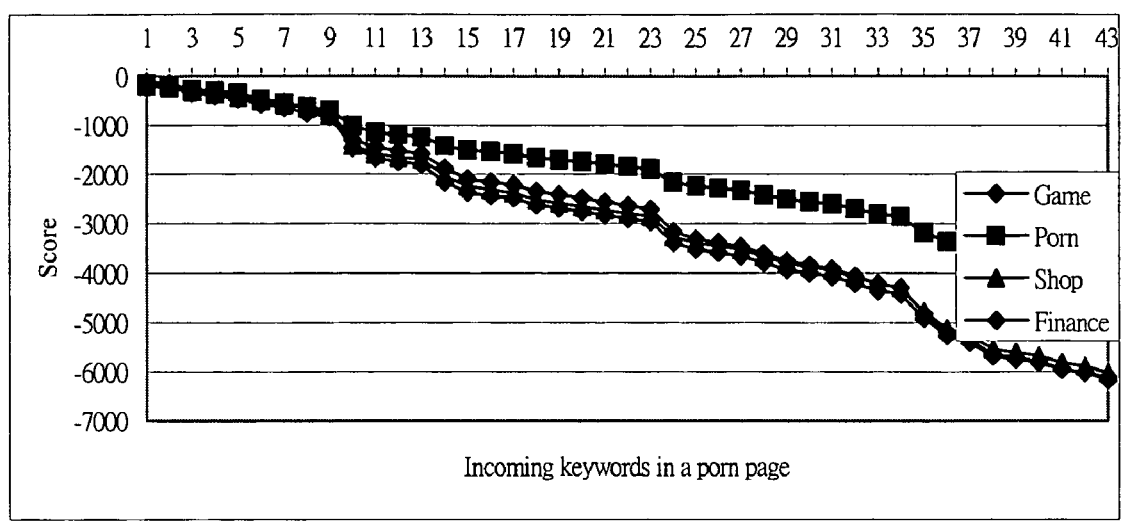
FIG. 2 and FIG. 3 show the scores for pornographic and normal web pages computed by the present method.
Figure 3:
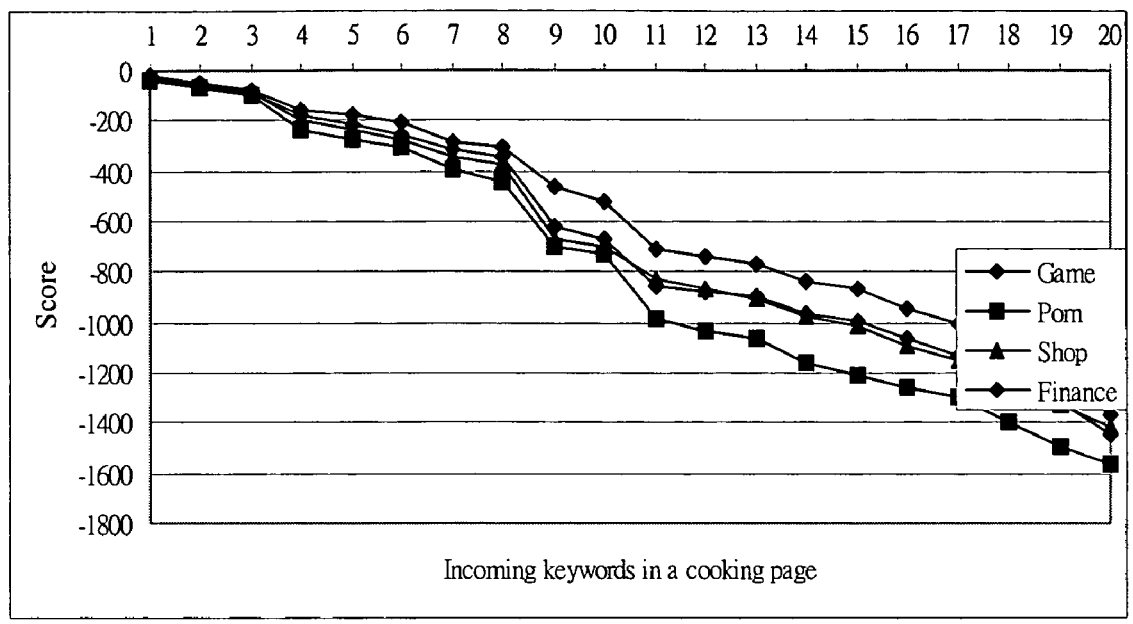

FIG. 2 and FIG. 3 show scores for pornography and normal web pages computed by the present method. According to the experimental data, after computing the score of the porn category, it is apparent that the text classification to the porn category contains higher relevance than the other text categories. In contrast, there are no big differences in scores among categories for a normal web page. Therefore, a blocking threshold can be set up based on the experimental data. By computing the score deviation and checking whether the web page belongs to a certain text category, the decision can be made as early as possible.

The bypassing threshold is a function of the times of keyword matching. Furthermore, the step (1A) also includes (3A) building an interval threshold and initializing an interval value, the step (1E) further includes (3B) computing an average interval of the object character in the information document as interval value, and the step (1G) further includes (3C) determining whether the interval value is larger than interval threshold.

Figure 4:
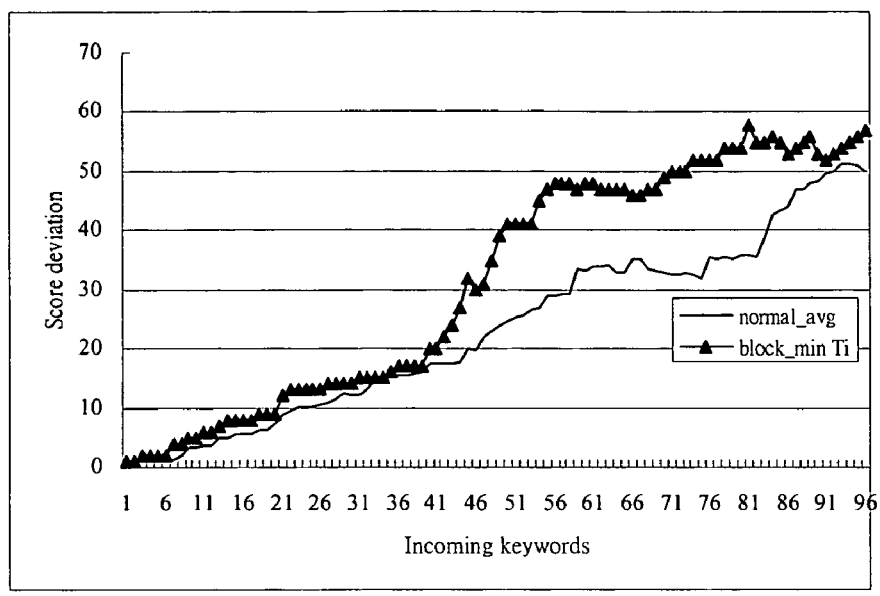
FIG. 4 is a score deviation comparison chart between bypassing threshold and the normal web page.

FIG. 4 shows a score deviation comparison chart between minimum blocking thresholds and the average scores of normal web pages. The score deviation increases with the number of keyword matching, Without losing filtering accuracy and to avoid scanning the whole document, web pages that would be less likely to be forbidden pages can be recognized and bypassed as soon as possible.

Figure 5:
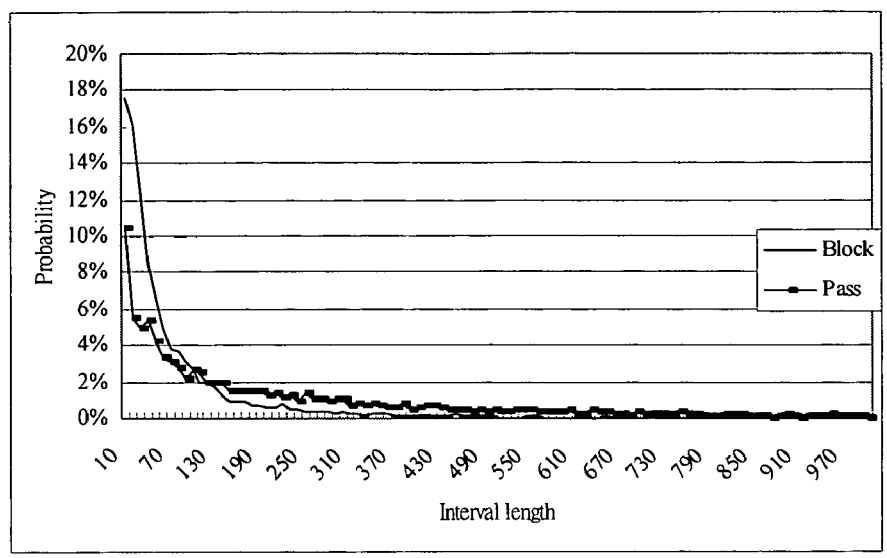
FIG. 5 is a keyword interval probability distribution diagram between normal pages and forbidden pages.

However, while computing the score deviation of first few keywords, the score deviation of forbidden pages (porn pages) might be lower than the bypassing threshold. They might be mis-recognized as normal pages and be allowed to pass. Therefore, it needs other methods for avoid the error. FIG. 5 shows a keyword interval probability distribution diagram between normal pages and forbidden pages. From the diagram, it is clear that the probability for keywords to have small intervals in forbidden pages is higher than that in normal pages. Therefore, in the step (1G), in addition to determine whether score deviation is lower than the bypassing threshold, it is also required to determine whether the interval length is larger than the interval threshold. If both of the two conditions are satisfied, the web page is bypassed. Therefore, it will ensure the precision.

Furthermore, the keyword probability chart can be achieved by the following steps:

(4A) provide a testing document category D={d1, d2, . . . , d|D|}, each testing document di is formed by a word sequence V={w1, w2, . . . , w|V|}, and each text category cj includes at least one testing document di;

(4B) in the testing document, based on the text category, compute word probability P(wt|cj) of each word wt in the text category cj;

(4C) in all text categories, based on the significance of word probabilities, choose a keyword set of a predetermined number.

(4D) build a relevance probability chart with keywords probability.

Figure 6:
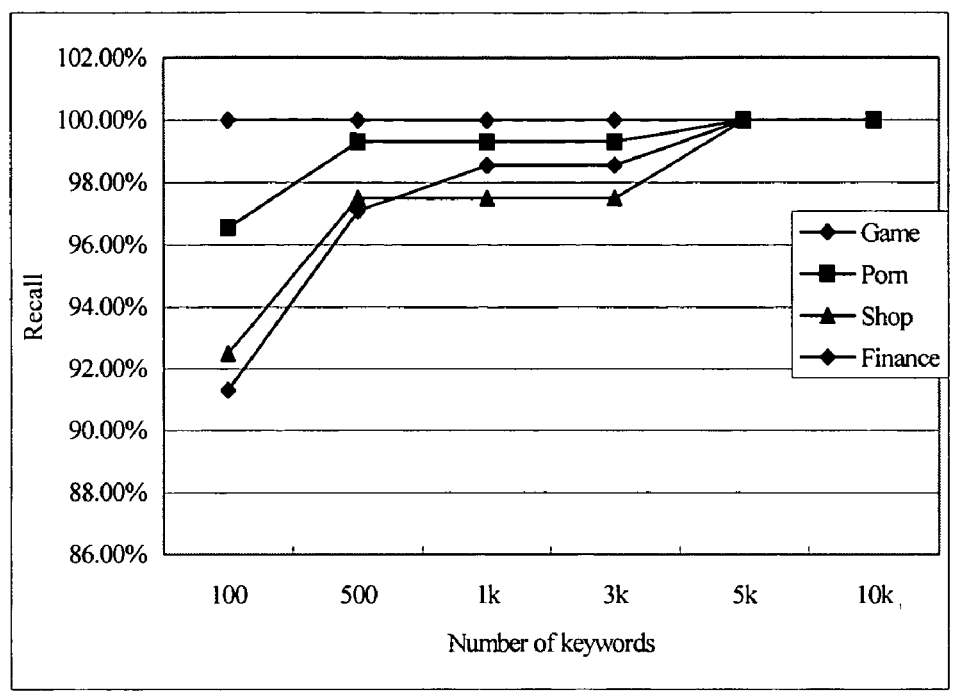
FIG. 6 shows a comparison chart between the number of keywords and filtering efficiency.

According to the experimental data, FIG. 6 shows a comparison chart between the number of keywords and the filtering efficiency. As shown in the figure, the filtering efficiency will be improved as the number of keywords increases. But, it also takes more computation. To balance the efficiency and computation, user can set up a predetermined number, say 500 keywords in this case, so as to reduce the computation and maintain filtering efficiency. Based on client's policy, the present system can be trained to provide their own forbidden categories, as mentioned in step (4A) to step (4D), to set up keyword probability chart. Therefore, all the accessed web pages will be checked by the present system. The page content will be compared with keywords to come out with a score deviation. By comparing between the blocking threshold and bypassing threshold, the correct decision can be made as early as possible without losing filtering precision and scanning the whole document.

Real time content analysis is an important technique in web content filtering. However, it may also suffer lower accuracy and longer processing time. In this work, the present invention provides two algorithms to speed up the classification process, namely early blocking and early bypassing. It allows making the blocking decision as early as we have enough confidence that the web document should be long to some forbidden category, and making the bypassing decision as soon as the document is considered a normal one. Therefore, the web content determination speed can be improved and users' waiting time can be reduced. Moreover, by the present method, the network gateway devices will allow to analyze more web content.

According to the experiment, under the environment with Pentium III 700 MHz CPU and NetBSD 1.6 operating system, compared with the efficiency of the original Bayesian classification algorithms, the efficiency of the present invention can be 4 times improved. Meanwhile, with F1 estimated method, the present method can still maintain a considerable precision, saying 92% in forbidden running flow and 96% normal running flow.

In summation of the foregoing section, the invention herein fully complies will all new patent application requirement and is hereby submitted to the patent bureau for review and granting of the commensurate patent rights.

The present invention may be embodied in other specific forms without departing from the spirit of the essential attributes thereof; therefore, the illustrated embodiment should be considered in all respects as illustrative and not restrictive, reference being made to the appended claims rather than to the foregoing description to indicate the scope of the invention.

What is claimed is:

1. A method for web content filtering, between web transmission contacting nodes, executing the following steps to determine bypassing web information:

(1A) building web page filtering decision criteria, at least including keyword category, a relevance probability chart for every keyword, a blocking threshold, and a bypassing threshold, and a score deviation (SD) having scores for each category;

(1B) getting web page from a web server;

(1C) looking for a next keyword;

(1D) determining whether a current word is a keyword, if yes, further proceed to the next step; if not, going to step (1H) and continue to check an information document;

(1E) computing a score deviation between a highest score and a second higher score from each category based on the relevance probability chart;

(1F) determining whether the score deviation exceeds the blocking threshold, if yes, label the web page as a forbidden one; if not, proceed to the next step;

(1G) determining whether the score deviation is lower than the bypassing threshold, if yes, label the web page as a bypassing one; if not, proceed to the next step; and (1H) reading next word from the web page and determining whether an end has been reached, if yes, label the web page as a bypassing one; if not, return to step (1D).

2. The method for web content filtering according to claim 1, wherein said bypassing threshold is a function depending on a predetermined number of times of keyword matching, a web page filtering decision criteria further includes a text classified category $C=\{c_1, c_2 \ldots, c_{|c|}\}$ that users want to forbid against, the relevance probability chart is build based on the text classification and the score deviation is achieved by the following steps:

(2A) initializing score category S corresponding to every text category;

(2B) computing the score in each category based on the relevance probability chart;

$$\text{Score}(c_j \mid d_i) = \frac{P(c_j)\log\left(\prod_{k=1}^{di} P(w_{di,k} \mid c_j)\right)}{P(d_i)}$$

(2C) choosing two most significant scores; and (2D) setting difference of them as the score deviation (SD), wherein P represents a probability, d represents a testing document category, and W represents a word sequence.

3. The method for web content filtering according to claim 1, wherein said step (1A) further includes step (3A) building an interval threshold and initializing an interval value, said step (1E) further includes step (3B) computing an average interval of an object character in the information document as interval value, and said step (1G) further includes step (3C) determining whether the interval value is larger than the interval threshold.

4. The method for web content filtering according to claim 1, wherein said keyword category and said relevance probability chart is achieved by the following steps:

(4A) providing testing document category $D=\{d1, d2 \ldots, d|D|\}$, each testing document di to be formed by a word sequence $V=\{w1, w2 \ldots, w|V|\}$, and each text category cj including at least one testing document di;

(4B) in the testing document, based on the text category, compute a vocabulary probability $P(wt|cj)$ of each word wt in the text category cj;

(4C) in all text categories, based on a highest degree of the vocabulary probability, choosing a vocabulary set of predetermined numbers as keywords; and (4D) building the relevance probability chart using keywords and corresponding probabilities.

5. The method for web content filtering according to claim 1, wherein said contact node is a gateway system of a local network.

6. The method for web content filtering according to claim 1, wherein said contact node is a gateway system of a personal computer.

* * * * *